(12) United States Patent
Eckerdt et al.

(10) Patent No.: US 8,704,635 B2
(45) Date of Patent: Apr. 22, 2014

(54) SECURE WEB ACCESSED BOX

(75) Inventors: George H. Eckerdt, Fishers, NY (US); George Mastrodonato, Rochester, NY (US)

(73) Assignee: Key Systems, Inc., Fishers, NY (US)

( * ) Notice: Subject to any disclaimer, the term of this patent is extended or adjusted under 35 U.S.C. 154(b) by 1347 days.

(21) Appl. No.: 12/464,370

(22) Filed: May 12, 2009

(65) Prior Publication Data
US 2009/0237207 A1 Sep. 24, 2009

Related U.S. Application Data (63) Continuation-in-part of application No. 11/421,635, filed on Jun. 1, 2006, now abandoned, which is a continuation-in-part of application No. 10/644,383, filed on Aug. 19, 2003.

(60) Provisional application No. 60/686,181, filed on Jun. 1, 2005.

(51) Int. Cl.
  *G08C 19/00* (2006.01)
(52) U.S. Cl.
  USPC ........................................................ 340/5.73
(58) Field of Classification Search
  USPC ................. 340/5.73, 5.2, 5.21–5.27, 5.7, 5.8, 340/5.81–5.86, 5.28, 5.42, 5.31; 70/85, 241
  See application file for complete search history.

(56) References Cited

U.S. PATENT DOCUMENTS

| | | | |
|---|---|---|---|
| 3,761,682 A * | 9/1973 | Barnes et al. | 235/381 |
| 4,750,197 A * | 6/1988 | Denekamp et al. | 455/404.2 |
| 5,244,020 A * | 9/1993 | Bruno et al. | 141/83 |
| 5,392,025 A * | 2/1995 | Figh et al. | 340/547 |
| 5,887,468 A | 3/1999 | Hasan | |
| 6,428,060 B1 | 8/2002 | Metz | |
| 6,434,985 B1 | 8/2002 | Walmsley | |
| 6,564,121 B1 | 5/2003 | Wallace et al. | |
| 6,675,067 B2 | 1/2004 | Blad | |
| 7,323,991 B1* | 1/2008 | Eckert et al. | 340/572.1 |
| 2003/0034390 A1* | 2/2003 | Linton et al. | 235/382 |
| 2003/0183136 A1* | 10/2003 | Perkins | 109/47 |
| 2004/0051626 A1* | 3/2004 | Pautler | 340/5.61 |
| 2004/0075533 A1* | 4/2004 | Ives et al. | 340/5.73 |
| 2004/0252018 A1* | 12/2004 | Shuster | 340/5.73 |
| 2005/0145740 A1* | 7/2005 | Rathmann et al. | 242/382 |
| 2005/0165612 A1* | 7/2005 | Van Rysselberghe | 705/1 |

* cited by examiner

*Primary Examiner* — Nabil Syed (57) ABSTRACT

A web accessed security box includes a web server that can communicate with a web browser to control access and account for asset events that occur when the box is used. A personal identifier must be satisfied to open a drawer of the box. A latching system uses both an access solenoid for normal opening and closing in response to the personal identifier, and an emergency release solenoid having a separate power supply to open the box when the access solenoid is disabled. Several features make the box secure against weather and tampering.

24 Claims, 7 Drawing Sheets

SECURE WEB ACCESSED BOX

REFERENCE TO RELATED APPLICATIONS

This application is a continuation-in-part of application Ser. No. 11/421,635, filed Jun. 1, 2006 entitled now abandoned "Multipurpose Interface and Control System", which is a continuation-in-part application of U.S. application Ser. No. 10/644,383, filed Aug. 19, 2003, entitled "Tangible Security Asset Management System and Methods Thereof", a non-provisional application to provisional application No. 60/686,181, filed Jun. 1, 2005, entitled "Multipurpose Interface and Controller".

FIELD OF THE INVENTION

Controlled access to security assets in boxes

BACKGROUND

A box containing a security asset, such as a key, must be secure. It should not easily yield to forced entry, and it should reliably open only to authorized people. A secure box should also be readily adaptable to many different locations and mounting arrangements. These often include, but are not limited to, walls structured in various ways. Security boxes should also be weather resistant so that they can be mounted in outdoor locations. Finally, security boxes should have emergency opening systems so they can admit access to a security asset during a fire, power failure, or other calamity. As these requirements suggest, security boxes can made in many different sizes and shapes that can be characterized as enclosures, containers, safes, compartments, etc. This application uses "box" as a simple term covering all these possibilities.

Previous suggestions for security asset boxes have failed to meet these requirements. The invention aims to remedy the shortcomings of prior art suggestions and to make available a security asset box that meets all of the above requirements at an affordable price.

SUMMARY

The inventive security box is made mechanically strong and resistant to weather and tampering. It includes a personal identifier that can actuate a solenoid to release an openable closure. For emergency access, the box includes an emergency solenoid actuatable by an emergency voltage to release a latching system and allow the box to be opened when its access solenoid is inoperable.

The box preferably includes a web server that can be accessed by a web browser. This allows information to flow into and out of the box, and such information can include changing or adding to the personal identifiers that can open the box, and generating and transmitting information about asset events that occur during normal operation of the box. These features allow information to be gathered remotely and allow remote instructions to be implemented to protect the ongoing security of the box.

DETAILED DESCRIPTION

The security box 10 as illustrated uses an openable closure such as a drawer, door, or lid that can open from a housing 50 to afford access to a security asset. A drawer 20 such as illustrated is convenient for several reasons as a way of accessing contents of box 10. Closure 20 contains a security asset such as a key (FIG. 8), but things other than keys can also be secured within box 10. These can include smart cards, special tools or anything of security importance that can fit within box 10 and deserves the expense of controlled access.

Access to box 10 is controlled by a personal identifier so that only authorized persons can gain access to box 10. One simple way that this can be done is with number pad 25 that can be conveniently arranged on a front face of closure 20. Biometric devices such as thumb or fingerprint readers, eye image readers, and possibly others, can all be used. The basic idea is to restrict access to box 10 to only the person or people who are authorized.

Box 10 preferably uses an access solenoid 30 arranged in box 10 or in drawer 20 to unlatch closure drawer 20 for opening in response to entry of an authorized personal identifier. Box 10 preferably also has an emergency opening system using an emergency release solenoid 40 that can be arranged in housing 50. A preferred latching system operable with solenoids 30 and 40 uses a sliding latch bar 41 having a hole 42 that can be engaged by emergency release solenoid 40, and having another hole 43 that can be engaged by access solenoid 30.

Figure 5:
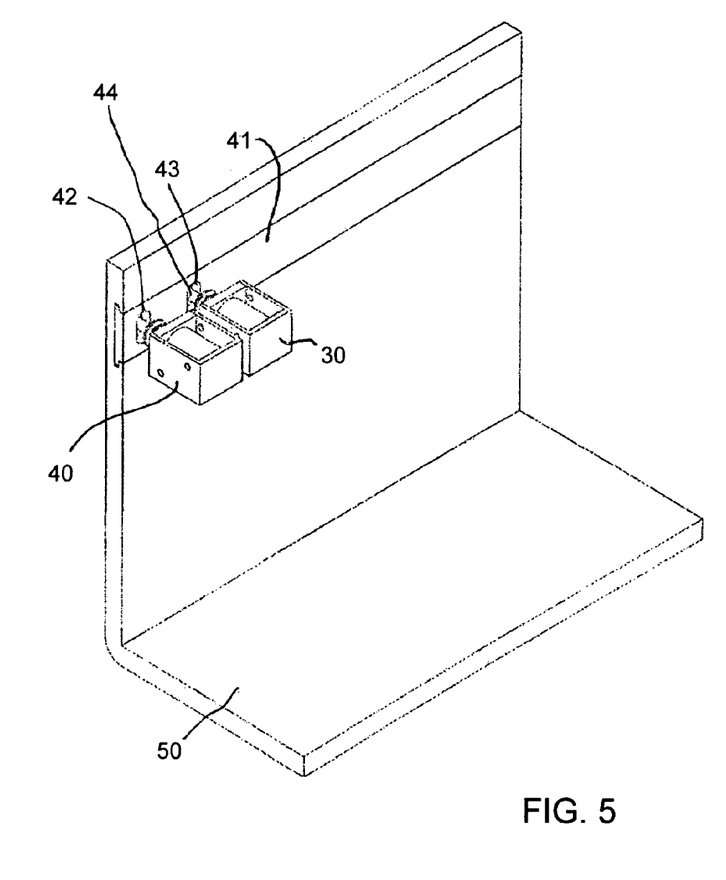
FIGS. 5-7 are fragmentary views of a latching and emergency opening system preferred for the box of FIGS. 1-4.
Figure 6:
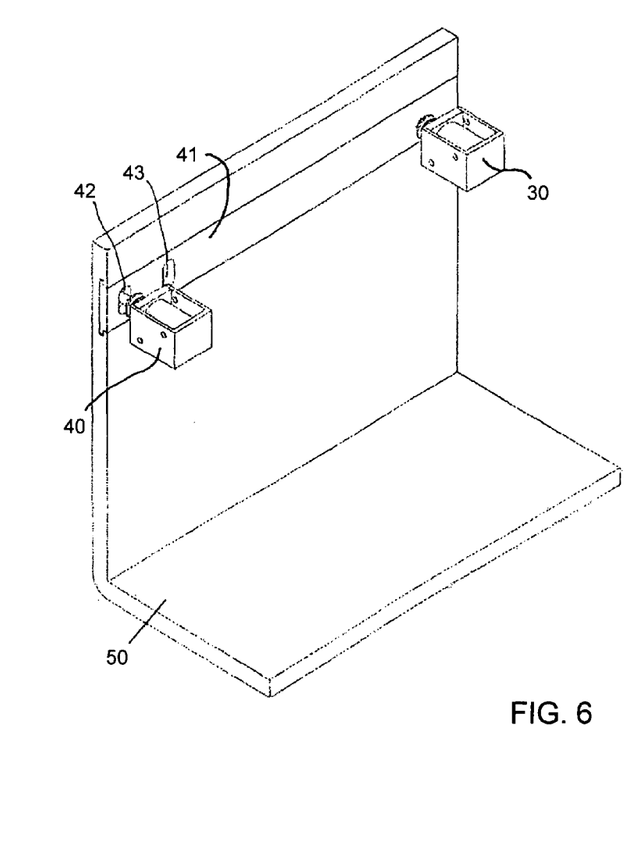
Figure 7:
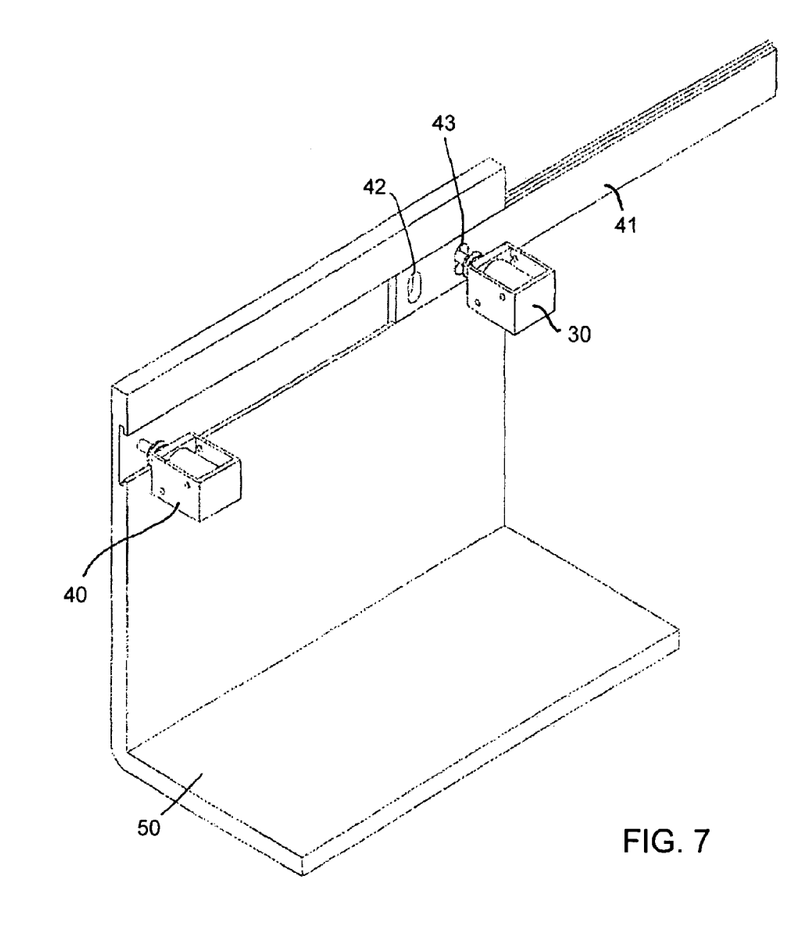

FIGS. 5-7 show how the access and the emergency release latching system works. The closed position is illustrated in FIG. 5 with solenoid 30 mounted on closure drawer 20 inside of housing 50 where emergency release solenoid 40 is mounted. Each of the solenoids engage slidable latch bar 41 at holes 42 and 43.

When access solenoid 30 is actuated, its pin retracts from hole 43 so that drawer 20 can open while access solenoid 30 moves with it to the position of FIG. 6. If access solenoid 30 is disabled, emergency release solenoid 40 can be actuated, as shown in FIG. 7. This allows sliding latch bar 41 to release and move with access solenoid 30, allowing closure drawer 20 to open.

An emergency disabling access solenoid 30 is often a power failure, so emergency release solenoid 40 has a different power supply, preferably from a source remote from box 10. This can be as simple as a 12-volt battery connectable to contacts wired to emergency release solenoid 40 at a location some distance away from box 10.

Another preferred aspect of the opening of drawer 20 is a push-to-release feature. This involves one or more springs 51 preferably arranged in a rear of housing 50 to bias drawer 20 toward an opening position. When access solenoid 30 is actuated, the pressure of springs 51 pushing forward on drawer 20 frictionally holds pin 44 of access solenoid 30 in place within hole 43 of slide bar 41. Pushing back on the front 26 of drawer 20 overcomes the spring pressure and allows solenoid pin 44 to release which then allows drawer 20 to move forward under the urging of springs 51. Drawer 20 can then be pulled out as far as necessary to reach the security asset that it contains.

Figure 3:
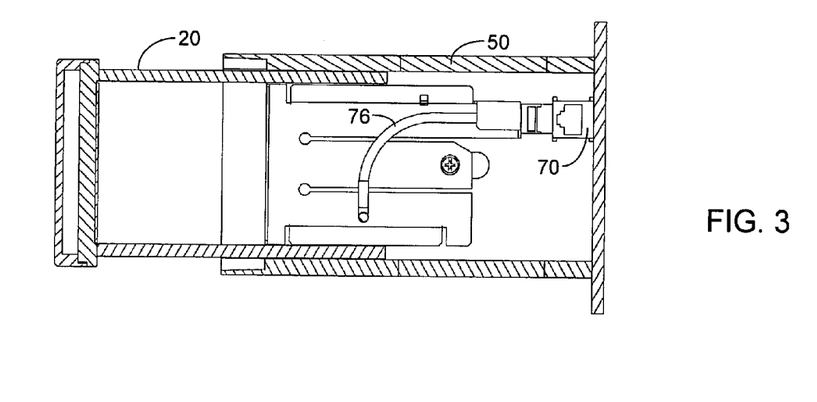
FIG. 3 is a cross-sectional view of FIG. 2, taken along the line 3-3 thereof.

Box 10 preferably includes a web server 60, which is conveniently arranged within closure drawer 20. This makes it accessible if repairs or replacement become necessary. Mother board 61 and other electronics are preferably also mounted in drawer 20. Power for the electronic components in drawer 20 is preferably derived from a power over Ethernet (POE) connection which preferably enters housing 50 via a rear opening 52 from which it can be plugged into a top of receptacle 70. A similar plug 71 on wiring tray 75 automatically plugs into receptacle 70 to power drawer components when drawer 20 is moved into a closed position. Wiring tray 75 then detents into housing 50 by means of a projection 73 entering an opening 74 in wiring tray 75. This holds wiring tray 75 in place as drawer 20 moves in and out, while a flexible cable 76 conveys power between receptacle 70 and components in moving drawer 20. (FIG. 3)

Figure 4:
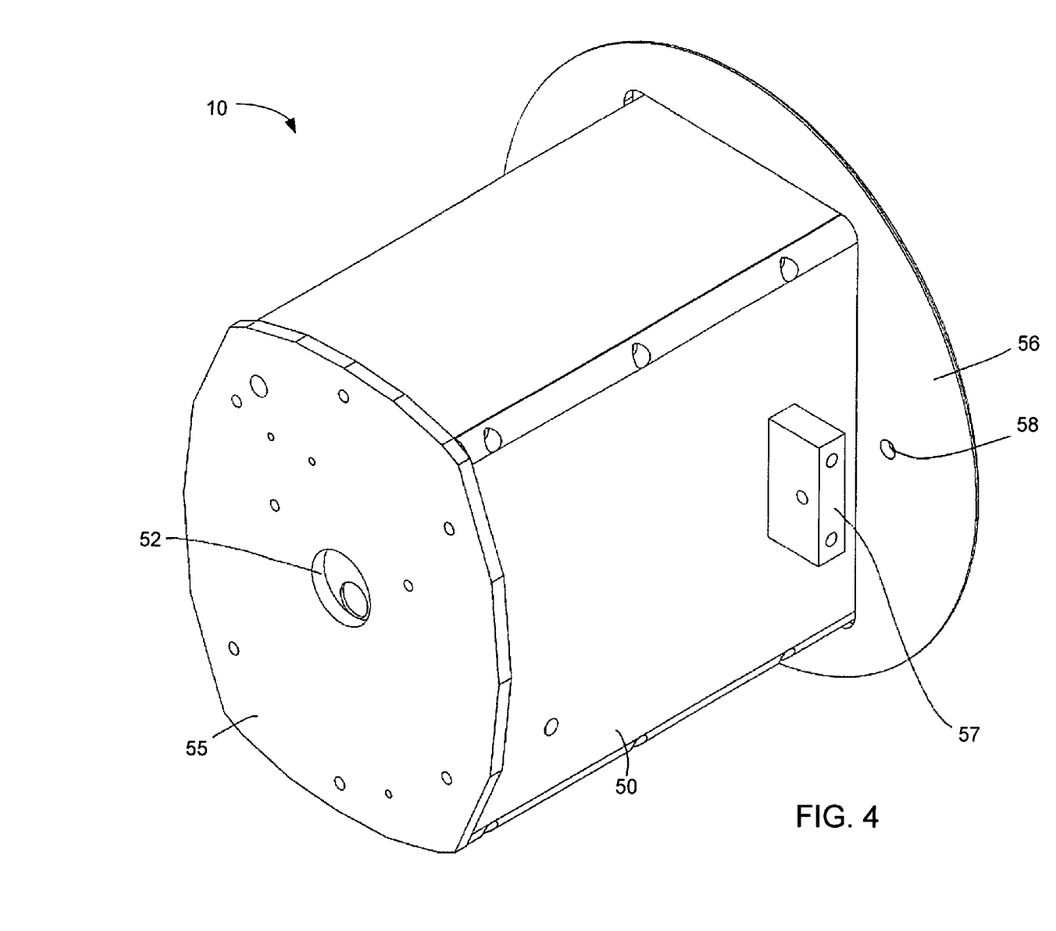
FIG. 4 is an oblique rear perspective view of the box of FIG. 1 with the drawer closed and a trim disk positioned on a front face.

Housing 50, as shown in FIG. 4, is designed for secure emplacement within a wall or other permanent structure. A rear end 55 has opening 52 for wiring purposes, and a front face of housing 50 preferably includes a circular trim disk 56 surrounding drawer front 26. This arrangement allows a circular hole to be drilled in a wall to receive housing 50 with disk 56 fitting tightly over and enclosing the opening.

Securing housing 50 within a wall can be done in several ways. One preferred way is to fill a cavity around housing 50 with an adhesive foam material that strongly resists any removal of housing 50. This can be enhanced by fixture blocks 57, one of which is shown in FIG. 4. Trim disk 56 can be secured to fixture block 57 by a screw extending through disk hole 58 and into block 57. Many other arrangements of fasteners, set screws, adhesives, welding, and other expedients can be used to secure housing 50 solidly in place.

Figure 1:
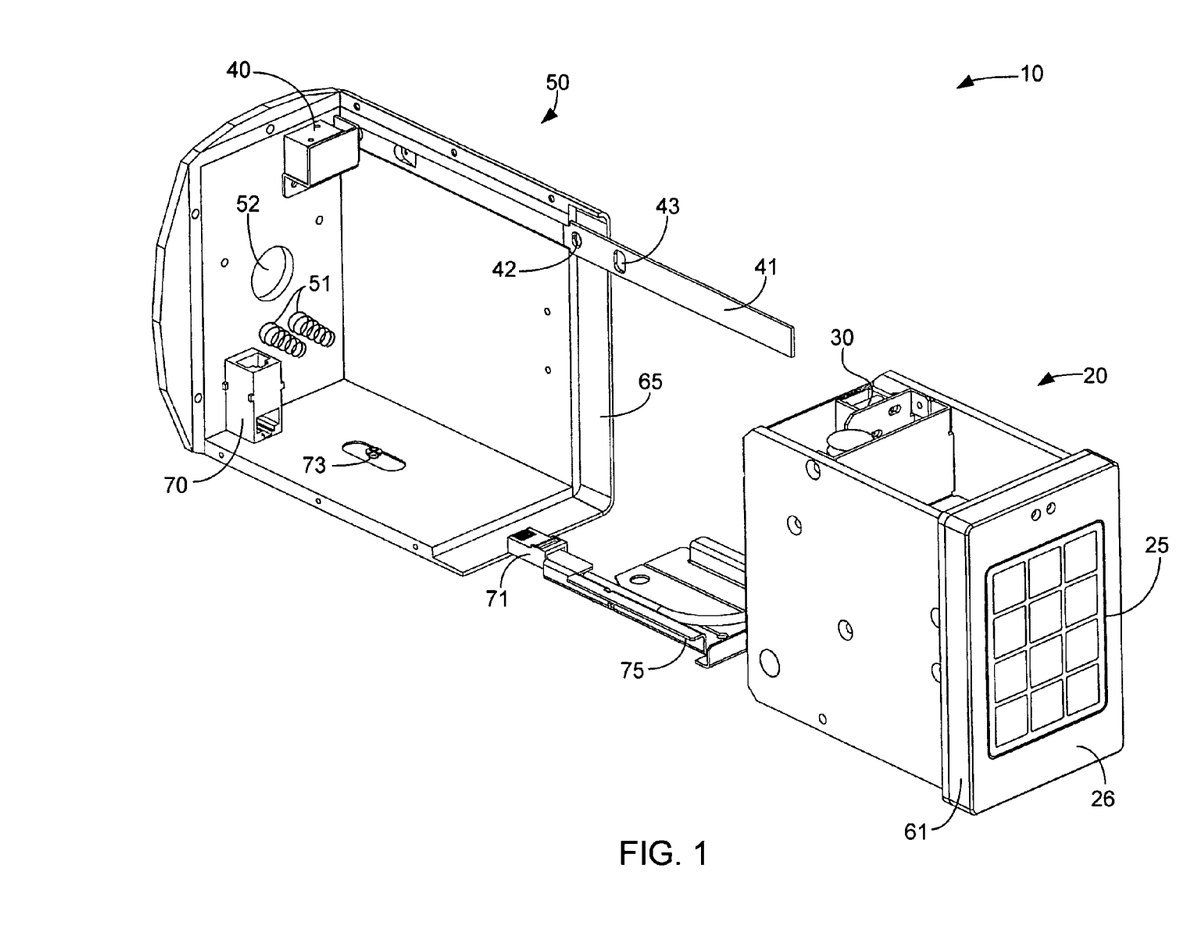
FIG. 1 is a partially cut-away and partially exploded perspective view of a preferred embodiment of the inventive security box.
Figure 2:
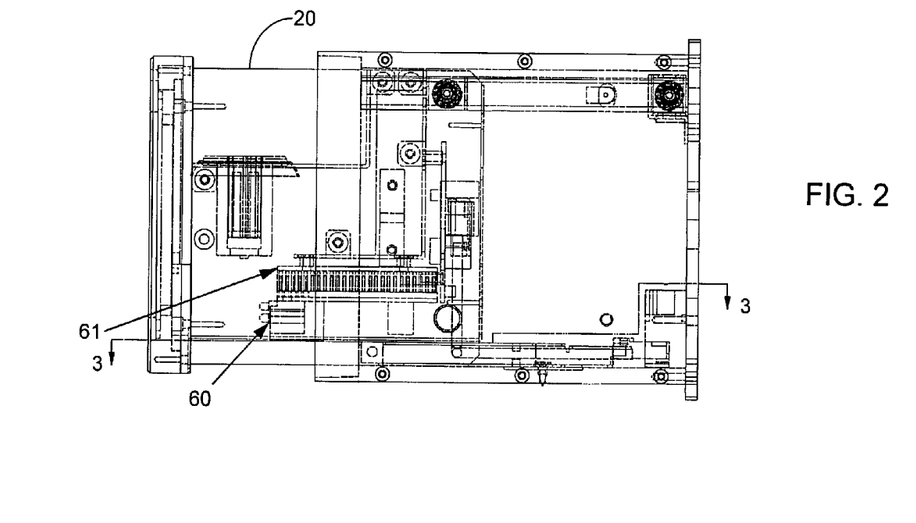
FIG. 2 is a side view of a drawer portion of the box of FIG. 1 with a side wall removed to show internal components.

The front opening 65 of housing 50 is preferably stepped and flared slightly outward to receive front perimeter 61 of drawer 20, as shown in FIG. 1. Front face 26 of drawer 20 preferably fits flush with front rim 65 of housing 50 when drawer 20 is closed. This affords no purchase for a pry bar to get a hold of drawer 20 and force it outward. Also, since moisture may enter the preferably thin gap between housing rim 65 and drawer perimeter 61, their confronting surfaces are preferably covered or coated with a non-stick material such as polytetrafluoroethylene. This helps prevent drawer 20 from freezing shut.

Figure 8:
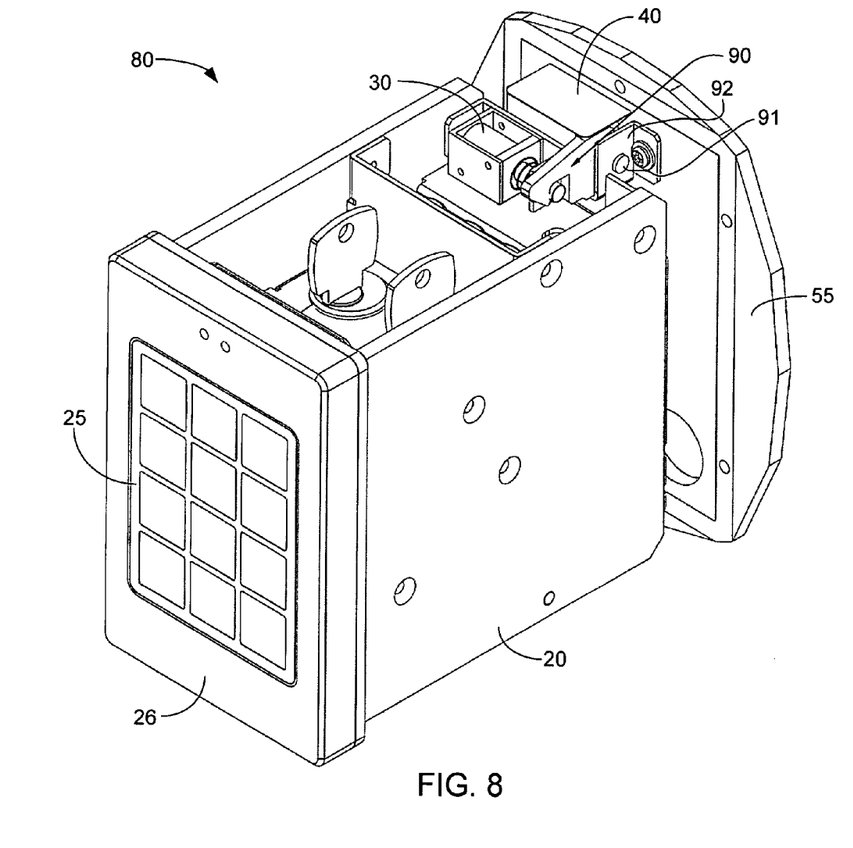
FIG. 8 is a perspective view of an alternative preferred embodiment shown without a housing to reveal a different latching system for the box.

An alternative box 80, illustrated in FIG. 8, is similar to box 10 except for a different latching arrangement. Access solenoid 30 still moves with drawer 20, and emergency release solenoid 40 is still fixed in housing 50, the rear plate 55 of which is shown in FIG. 8. Instead of sliding bar latch 41, box 80 has a pivoting latch 90 normally engaged and disengaged by access solenoid 30 for opening and closing of drawer 20. Pin 91 of solenoid 40 holds latch arm 90 in place by passing through latch arm 90 and into fixed bracket 92, which is secured to rear housing wall 55. In an emergency, solenoid 40 actuates to retract pin 91 and release latch arm 90 from housing rear plate 55 so that latch arm 90 is free to move with drawer 20 even though access drawer solenoid 30 is disabled.

What is claimed is:

1. A security box for controlling access to a security asset and for producing asset event information, the security box comprising:
    an openable closure;
    an access solenoid arranged to control the openable closure;
    a personal identifier arranged to actuate the access solenoid to allow opening of the openable closure to gain access to the security asset;
    a web server arranged to produce, transmit, and receive the asset event information;
    an emergency solenoid configured to receive an emergency voltage to release the openable closure to gain access to the security box, and
    a latch element engaged by both the access solenoid and the emergency solenoid so that the access solenoid releases from the latch and moves with the openable closure when the access solenoid is actuated, and the latch moves with the access solenoid and the openable closure when the emergency solenoid is actuated.

2. The security box of claim 1 wherein the web server is adapted to be accessed by a web browser so that a user of the web browser can remotely perform at least one of the following actions:
    request and receive information about the security box from the web server; and
    request and receive asset event information from the web server.

3. The security box of claim 1 wherein the openable closure is spring biased toward movement in an opening direction so that pushing the openable closure against the spring bias when the access solenoid is actuated allows a pin of the access solenoid to retract and thereby allows the spring bias to move the openable closure toward an open position.

4. The security box of claim 1 wherein the access solenoid, the personal identifier, and the web server are configured to receive power from a power over ethernet connection.

5. The security box of claim 1, further comprising a housing having a housing rim, and wherein:
    the openable closure is a drawer that closes flush within the housing;
    the housing rim and a periphery of the drawer are tapered and coated with a non-stick material.

6. The security box of claim 1 wherein the web server communicates with a network via a cellular modem.

7. The security box of claim 1 wherein the openable closure comprises a drawer, and wherein the security box further comprises:
    a housing for the drawer, the housing including a receptacle configured to receive power over ethernet;
    a wiring tray detented in a position within the housing and pluggable into the receptacle, and wherein the wiring tray includes a flexible cable providing communication with the web server and the access solenoid.

8. The security box of claim 1 wherein the access solenoid can be actuated from a remote location.

9. A security box for containing and controlling access to a security asset, the security box comprising:
    an openable closure;
    a latch;
    an access solenoid engaging the latch to hold the openable closure closed;
    a personal identifier arranged to actuate the access solenoid to release the access solenoid from the latch and thereby allow the openable closure to open; and
    an emergency solenoid configured to receive an emergency voltage to release the latch engaged by the access solenoid so that the openable closure can be opened by moving the latch with the access solenoid and the openable closure when the access solenoid is unactuated but the emergency solenoid is actuated.

10. The security box of claim 9, further comprising a web server adapted to be accessed by a web browser so that a user of the web browser can remotely perform at least one of the following actions:
- request and receive information about the security box from the web server; and
- request and receive asset information from the web server.

11. The security box of claim 10, wherein the at least one action able to be remotely performed further comprises an action selected from the group consisting of:
- updating information used by the personal identifier to selectively actuate the access solenoid;
- implementing remote instructions on the security box.

12. The security box of claim 9 wherein the emergency solenoid is further configured to receive the emergency voltage from a battery remote from the security box.

13. The security box of claim 9 wherein the openable closure comprises a drawer.

14. The security box of claim 13, further comprising a housing, and wherein a face of the drawer closes flush with the housing.

15. The security box of claim 14 wherein a gap around the drawer face is tapered and coated with a non-stick material.

16. A security box for controlling access to a security asset, the security box comprising:
a) an openable closure;
b) an access solenoid arranged to control the openable closure;
c) a personal identifier arranged to actuate the access solenoid to allow opening of the openable closure to gain access to the security asset;
d) a web server adapted to be accessed by a web browser so that a user of the web browser can remotely perform at least one of the following actions:
  1) request and receive information about the security box from the web server; and
  2) request and receive asset event information from the web server;
e) an emergency solenoid; and
f) a latch element engaged by both the access solenoid and the emergency solenoid so that the access solenoid releases from the latch and moves with the openable closure when the access solenoid is actuated, and the latch moves with the access solenoid and the openable closure when the emergency solenoid is actuated.

17. The security box of claim 16 wherein the openable closure is spring biased toward movement in an opening direction so that pushing the openable closure against the spring bias when the access solenoid is actuated allows a pin of the access solenoid to retract and thereby allows the spring bias to move the openable closure toward an open position.

18. The security box of claim 16 wherein the access solenoid, the personal identifier, and the web server are configured to receive power from a power over ethernet connection.

19. The security box of claim 16, further comprising a housing having a housing rim, and wherein:
- the openable closure is a drawer that closes flush within the housing;
- the housing rim and a periphery of the drawer are tapered and coated with a non-stick material.

20. The security box of claim 16 wherein the web server communicates with a network via a cellular modem.

21. The security box of claim 16 wherein the openable closure comprises a drawer, and wherein the security box further comprises:
- a housing for the drawer, the housing including a receptacle configured to receive power over ethernet;
- a wiring tray detented in a position within the housing and pluggable into the receptacle, and wherein the wiring tray includes a flexible cable providing communication with the web server and the access solenoid.

22. The security box of claim 16 wherein the access solenoid can be actuated from a remote location.

23. The security box of claim 16, wherein the security asset comprises at least one object selected from the group consisting of a key, a smart card, and a tool.

24. The security box of claim 1, wherein the security asset comprises at least one object selected from the group consisting of a key, a smart card, and a tool.

* * * * *